United States Patent [19]

Burger et al.

[11] Patent Number: 4,955,464

[45] Date of Patent: Sep. 11, 1990

[54] CONVEYOR DEVICE FOR TRANSPORTING WORKPIECES

[75] Inventors: Karl-Heinz Burger, Bühl-Vimbuch; Rosemarie Collmer, Waiblingen; Walter Fimpel, Bühl-Oberweier; Klaus Gieseler, Villingen-Schwenningen-Obereschach; Heinrich Kochendörfer, Kernen-Rommelshausen; Helmut Steegmüller, Affalterbach, all of Fed. Rep. of Germany

[73] Assignee: Robert Bosch GmbH, Stuttgart, Fed. Rep. of Germany

[21] Appl. No.: 146,368

[22] Filed: Dec. 15, 1987

[30] Foreign Application Priority Data

May 3, 1986 [DE] Fed. Rep. of Germany ....... 3615064

[51] Int. Cl.$^5$ .............................................. B65G 37/00
[52] U.S. Cl. .................. 198/463.3; 198/586; 198/592
[58] Field of Search ............... 198/372, 367, 457, 592, 198/465.3, 620, 604, 611, 609, 586, 463.3

[56] References Cited

U.S. PATENT DOCUMENTS

| | | | |
|---|---|---|---|
| 1,912,898 | 6/1933 | Jennings et al. | 198/463.3 X |
| 2,888,126 | 5/1959 | Leaman et al. | 198/463.3 |
| 3,104,007 | 9/1963 | Swezey et al. | 198/809 |
| 3,540,567 | 11/1970 | Keller | 198/457 X |
| 3,690,435 | 9/1972 | King et al. | 198/463.3 |

FOREIGN PATENT DOCUMENTS

| | | | |
|---|---|---|---|
| 0030015 | 4/1964 | Fed. Rep. of Germany ... | 198/463.3 |
| 2108023 | 8/1972 | Fed. Rep. of Germany ... | 198/463.3 |
| 2728016 | 1/1979 | Fed. Rep. of Germany ...... | 198/457 |
| 3223357 | 12/1983 | Fed. Rep. of Germany ... | 198/463.3 |
| 0816898 | 3/1981 | U.S.S.R. ............................ | 198/592 |

Primary Examiner—Robert J. Spar
Assistant Examiner—James R. Bidwell
Attorney, Agent, or Firm—Michael J. Striker

[57] ABSTRACT

A conveyor device for transporting workpieces, particularly workpiece carriers (80) has two parallel transport ways (1, 2) and a transverse conveyor (3) arranged between the latter. The support frame of the transverse conveyor (3) has an immovably arranged central section (90) and two end sections (100, 110) mounted pivotably on the latter. Each of these end sections (100, 110) intersects an inner roller system (60 or 70) of a transport way (1 or 2) and bridges the space between the roller system (60 or 70) and an outer web belt (4 or 5) of the transport ways (1 or 2). A lift device (410 or 420) by which the end sections (100, 110) are pivotable into a plurality of different vertical positions relative to the transport ways (1, 2) is associated with each of the two end sections (100, 110).

8 Claims, 1 Drawing Sheet

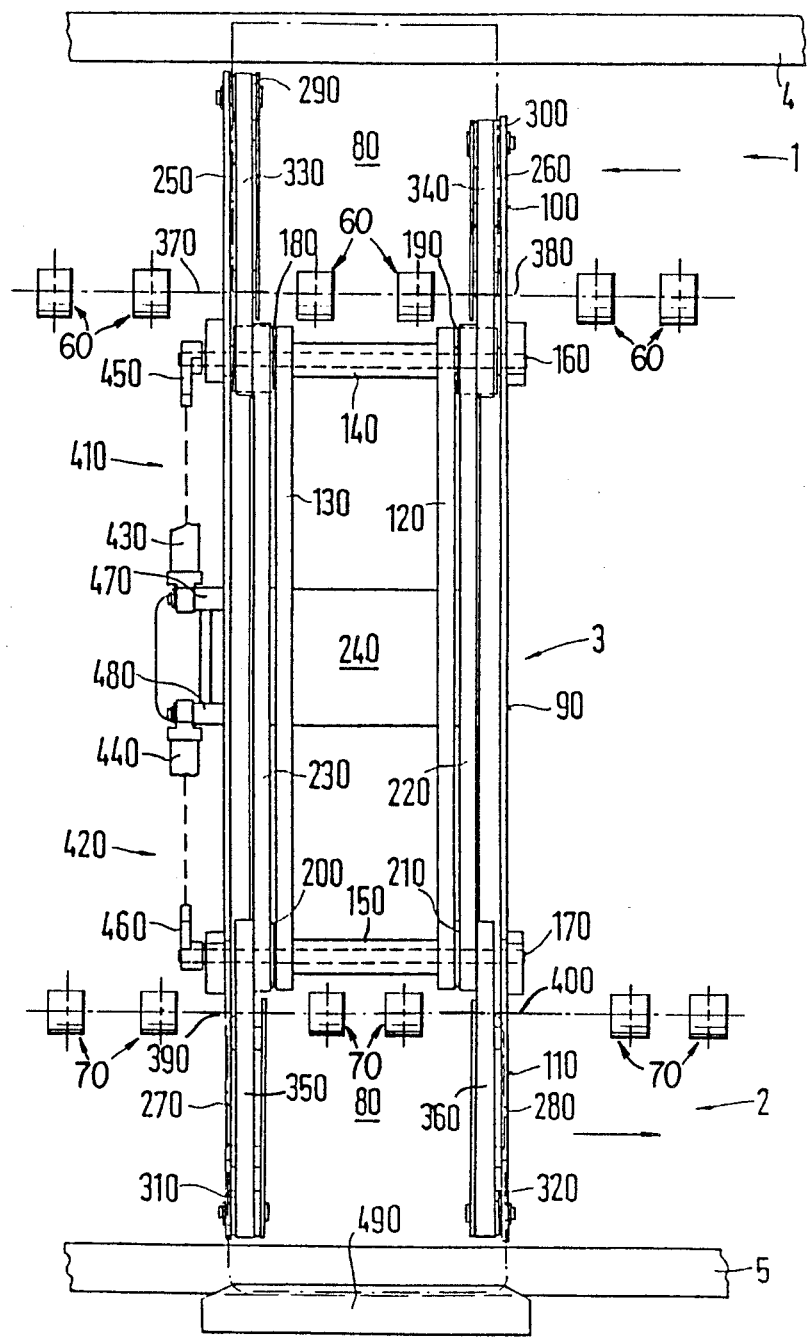

_4,955,464_

CONVEYOR DEVICE FOR TRANSPORTING WORKPIECES

PRIOR ART

The invention relates to a conveyor device for transporting workpieces, particularly workpiece carriers, with two parallel transport ways which each have an externally located conveyor belt, preferably a continuous web belt guided over rollers, and each have an internally located roller system arranged at an interval from the conveyor belt and with at least one transverse conveyor arranged between the two transport ways according to Patent . . . German Application No. P 36 01 699.3.

In the case of the subject of the parent patent the transverse conveyor has a rigid support frame which intersects the internally located roller systems and bridges the vacant space between the roller systems and the externally located web belts of both transport ways. A lift device to raise or lower the transverse conveyor on one or both sides is associated with the support frame.

It has now been discovered that this construction can be further improved, particularly as regards the mass to be moved, in that the support frame of the transverse conveyor consists of an immovably arranged central section and two end sections mounted pivotably thereon, each of which intersects the internally located roller system of a transport way and bridges the vacant space between the roller system and the web belt, and each of which is engaged by a device for pivoting the end sections. In order to transfer the workpieces or workpiece carriers from one transport way onto the other, it is therefore not necessary to move the entire transverse conveyor; on the contrary, only the relatively short and light end sections of the support frame execute pivoting movements for this purpose, whereas the comparatively long and heavy central section of the support frame remains stationary. Bearing problems and guidance problems for the support frame of the transverse conveyor are eliminated, because its immovable, firmly anchored central section itself forms the bearing basis for the movable end sections.

It is particularly advantageous that the two end sections are each connected integrally to a shaft mounted for rotation on the central section and engaged by a lift device for pivoting. A simple construction of the transverse conveyor with economy of parts can be achieved with this design in that return rollers for continuous web belts associated with the central section with the two end sections of the support frame are mounted on the shafts. If is further advantageous that the return rollers for the web belts of the central section and the return rollers seated on the shafts for the web belts of the end sections are mutually connected for joint rotation. By this means a single motor is sufficient for driving all the web belts.

DRAWING

An exemplary embodiment of the invention is illustrated in the drawing and explained in detail in the following description. The drawing shows a transverse conveyor constructed according to the invention in plan.

DESCRIPTION OF THE EXEMPLARY EMBODIMENT

The conveyor device illustrated consists substantially of two parallel transport ways 1, 2 and a transverse conveyor 3 connecting the latter. The two parallel transport ways 1, 2 each have an externally located driven web belt 4 or 5, which travels over return rollers, not shown, and each have an internally located roller system 60 or 70 with support rollers and guide rollers, not shown in detail, for workpiece carriers 80. The two transport ways 1, 2 are fastened on frames, not shown for the sake of clarity, and located at equal height, and are oriented mutually parallel with a prescribed interval. The workpiece carriers 80 rest upon the web belts 4 or 5 and upon the roller systems 60 or 70 and are transported at a speed prescribed by the feed of the web belts. The transport direction of the two ways is marked by arrows and each extends in an opposite direction.

Between the transport ways 1, 2 the transverse conveyor 3 already referred to is present, which bridges the interval between the ways, and by means of which workpiece carriers 80 can be transferred from the way 1 onto the way 2. Particularly, the transverse conveyor 3 has a support frame which consists of an immovable, firmly anchored central section 90 and two end sections 100, 110 mounted pivotably at the two ends of the central section. The central section 90 consists of two rails 120, 130 arranged mutually parallel, which are mutually connected at both their ends by distance bushings 140, 150. These bushings are each penetrated by a shaft 160 or 170, on the ends of each of which located outside the rails 120, 130 a pair of return rollers 180, 190 or 200, 210 is mounted for rotation. A web belt 220 or 230 associated with the central section 90 travels over each of the internally located return rollers. These belts are driven by frictional engagemment by a motor 240 fastened to the rails 120, 130. The drive force is transmitted through the belts 220, 230 and the internally located return rollers 180–210 to the externally located return rollers of the which are connected integrally to the internal return rollers for joint rotation on the shaft 160,170.

There is also fastened to both ends of each of the shafts 160, 170 a rail 250, 260 or 270, 280, on the free end of each of which a further return roller 290, 300 or 310, 320 is mounted. Further web belts 330 to 360, of which the web belts 330, 340 pertain to the end section 100 and the web belts 350, 360 to the end section 110 of the support frame of the transverse conveyor 3, travel over the latter return rollers and the externally located return rollers of the return roller pairs 180 to 210.

As can be seen from the drawing, the end sections 100, 110 including the rail pairs 250, 260 or 270, 280 and the web belts 330, 340 or 350, 360, intersect the internally located roller systems 60, 70 and bridge the vacant space between these roller systems and the externally located web belts 4, 5 of the two transport ways 1, 2. The roller systems 60, 70 are provided for this purpose with recesses or disconnections 370, 380 or 390, 400 for the passage of the rail pairs 250–280 and their web belts 330–360.

Two mutually independently operable lift devices 410, 420 for the vertical pivoting of the end sections 100, 110 are also associated with the transverse conveyor. In the exemplary embodiment they consist of pneumatic or hydraulic units, which each have a pivoting cylinder 430 or 440 and a piston guided therein, the piston rod of which is articulately connected to lever arm 450 or 460 attached to the shaft 160 or 170. The bearing bolts of the pivot cylinders, which are anchored on the central section 90 of the support frame, are designated 470 and 480.

Each lift device can be adjusted independently of the other to three defined vertical positions of the end sections 100, 110. In the bottom position the end sections are located lower than the parts 4, 60 and 5, 70 of the transport ways 1 and 2. In this bottom position the transverse conveyor has no influence on the transport direction of the workpiece carriers 80 advanced by the transport way 1 or the transport way 2.

In the central position the end sections are pivoted up so far by the lift devices 410 or 420 that the rail 250 or 270 of the end section, which is constructed as a stop, passes into the movement path of a workpiece carrier 80 brought up on the transport way 1 or 2 and stops the latter. This central position is illustrated in the drawing in respect of a workpiece carrier 80 brought up by the transport way 1. The workpiece carrier 80 is stopped on the transport way 1 by the rail 250, but is not yet transported onwards transversely to the way 1. The device according to the invention thus serves also as a stopper or separator for the workpiece carriers 80.

If it is desired to feed the workpiece carrier 80 stopped by the rail 250 to the transport way 2, then by an appropriate control of the lift devices 410, 420 the end sections 100, 110 are provided into their top positions. The web belts 330, 340 of the end section 100 then move from beneath into abutment with the workpiece carrier 80 stopped by the rail 250 and lift it off the web belt 4 and off the rollers of the roller system 60 of the transport way 1. The lifted workpiece carrier is shifted by the web belts 330, 340 of the end section 100 onto the web belts 220, 230 of the central section 90 and passed on from the latter to the web belts 350, 360 of the other end section 110. The web belts 350, 360 push the workpiece carrier 80 against a stop 490 mounted on the transport way 2. In top position of the end section 110, the workpiece carrier 80 is located above the web belt 5 and the rollers 70 of the transport way 2 and can, by lowering the end section 110 into its central position, be placed on the parts 5, 70 and transported away. During the transfer of the workpiece carrier onto the transport way 2, the end section 100 may be left in its top position, whereby its rail 260 stops further workpiece carriers 80 brought up on the transport way 1. As soon as the workpiece carrier present on the transverse conveyor 3 has left the end section 100, the latter can be lowered again into the central position, so that the next workpiece carrier is brought up by the web belt 4 of the transport way 1 to the rail 250 of the end section 100, which acts as a stop.

The mutually independently operable lift devices 410, 420 may be controlled so that the two end sections 100, 110 of the support frame swing alternately between their central and their top position when the transverse transport of workpiece carriers 80 is required to take place.

It is also possible to store a plurality of workpiece carriers on the transverse conveyor 3, in that the end section 110 is left in its top position and the end section 100 is pivoted to and fro several times between the central and the top positions, whereby a plurality of workpiece carriers 80 pass onto the transverse conveyor 3 without being transported awy by the transport way 2. It is likewise possible to interchange the function of the transport ways 1, 2, that is say to use the way 2 for feeding and the way 1 for transporting away the workpiece carriers 80. Thus continuous travel, stopping, transverse transport, preliminary singling, singling and deposition of workpiece carriers 80 upon one of the transport ways are possible.

We claim:

1. Conveyor device for transporting workpieces, comprising two parallel transport ways each including an outer conveyor belt and an inner roller system extending at a distance parallel to the outer conveyor belt; a transverse conveyor having a stationary support frame provided between the two transport ways and supporting an immovably arranged central conveyor section and two pivotably mounted end conveyor sections; each of said end conveyor sections intersecting the inner roller system of a transport way and bridging the space between the roller system and the corresponding outer conveyor belt; and device for pivoting respective end conveyor sections into predetermined vertical positions relative to the associated transport ways.

2. Conveyor device according to claim 1 wherein said support frame supports for rotation two shafts, each of said end conveyor sections being integrally connected at one end thereof to one of said shafts to rotate jointly therewith, and said pivoting device being linked to said shafts to rotate the same into said predetermined vertical positions of said end conveyor sections.

3. Conveyor device according to claim 2 wherein each of said shafts supports for rotation two pairs of return rollers, the inner rollers of each pair supporting a conveyor belt of said central conveyor section, and the outer rollers of each pair supporting a conveyor belt of an end conveyor section.

4. Conveyor device according to claim 3 wherein the inner and outer roller in each pair are connected for joint rotation.

5. Conveyor device according to claim 4 wherein each of said shafts is provided with a lever arm, said pivoting device includes two pneumatic actuators each having a cylinder pivotably anchored on said support frame of the central conveyor section, and a piston which is linked to one of said lever arms to lift the corresponding end conveyor section into one of said predetermined vertical positions.

6. Conveyor device according to claim 5 wherein each of said end conveyor sections is pivoted in a recess or discontinuity of the associated inner roller system.

7. Conveyor device according to claim 6 wherein said uniform pieces are workpiece carriers bearing upon said outer conveyor belt and inner roller system of respective transport ways, and said end conveyor sections being provided with rails for stopping and guiding said workpiece carriers.

8. Conveyor device according to claim 4 wherein said support frame supports a motor for driving the conveyor belts of said central conveyor section.

* * * * *